INVENTOR.
SAMUEL R. FULTON
LAWRENCE E BEAL
BY
Teare, Teare & Sammon
ATTORNEYS

Fig. 5

INVENTOR.
SAMUEL R. FULTON
LAWRENCE E. BEAL
BY
Seare, Seare & Sammon
ATTORNEYS

INVENTOR.
SAMUEL R. FULTON
BY LAWRENCE E. BEAL

Peare Peare, & Sammon
ATTORNEYS

Aug. 29, 1972  S. R. FULTON ET AL  3,687,780
PIVOTAL TIRE BUILDING MACHINE FRAME HAVING
DRUM AND BEAD SETTING UNITS
Filed May 7, 1970  9 Sheets-Sheet 9

INVENTOR.
SAMUEL R. FULTON
LAWRENCE E. BEAL
BY
Peare, Peare, & Sammon
ATTORNEYS

United States Patent Office 3,687,780
Patented Aug. 29, 1972

3,687,780
PIVOTAL TIRE BUILDING MACHINE FRAME HAVING DRUM AND BEAD SETTING UNITS
Samuel R. Fulton, Cuyahoga Falls, and Lawrence E. Beal, Wadsworth, Ohio, assignors to Eagle-Picher Industries, Inc., Cincinnati, Ohio
Filed May 7, 1970, Ser. No. 35,540
Int. Cl. B29h *17/22*
U.S. Cl. 156—403
13 Claims

ABSTRACT OF THE DISCLOSURE

A tire building machine including a frame, having inboard and outboard ends. A collapsible tire building drum is mounted for rotation between the inboard and outboard ends. The inbroad end includes a stationary lower section and an upper section mounted for pivotal movement on the lower section. The drum is rigidly connected to the upper section of the inboard end and detachably connected to the outboard to enable the drum to be pivoted clear of the frame for a removal of a tire carcass therefrom. Bead setting units are mounted on the frame adjacent the opposite ends of the drum for registering bead rings therewith. Each of the bead setter units includes a bead ring holder movable toward and away from the adjacent end of the drum. Each end of the drum includes a sleeve-like receptacle which is adapted for telescopic connection with a respective coaxially aligned sleeve carried by each of the holders to align the bead-rings with respect to the drum. A stitcher mechanism is provided including an adjustment collar having a stepped-like construction to enable the degree of throw to be preset during the stitching operation.

BACKGROUND OF THE INVENTION

The present invention relates to an apparatus for building tires, and more particularly to an improved bead setter assembly for more accurately aligning bead rings with a tire building drum. Heretofore, tire building machines have included bead setter units which have been movably mounted on the machine frame being adapted for movement toward and away from the opposite ends of the tire building drum to register circular bead rings on the drum adjacent the opposite ends thereof. These bead setter units have generally included cylindrical bead ring holder which are mounted generally concentrically with respect to the drum being adapted to carry a bead ring axially over the respective outer sections of the drum. These bead ring holders have generally been supported entirely, or for the most part by the machine frame and independent of the drum which tended to cause misalignment of the bead ring with respect to the drum when placed in position thereon. In addition, the tire building drum was supported in generally cantilever-like relation on the machine frame to enable removal of a tire carcass from the tire building drum. This arrangement also contributed to misalignment of the bead ring with respect to the tire drum making it difficult to control the radial run out of the finished tire product, and thus, affecting the overall balance thereof. As tires are presently required to operate at substantially increased rotational speeds, it has become necessary to improve the overall balance of tires, and more particularly, to reduce the radial run out thereof, or at least maintain such within the lowest possible tolerances. In addition, tire building machines have been equipped with stitcher mechanisms having adjustable stitcher wheels thereon which have been adjustable with respect to the tired drum. These former devices have not proven to be entirely satisfactory in that they have been difficult and cumbersome to operate when making adjustments for different sized tires. Therefore, it has become desirable to provide a more facile and expeditious means for presetting and controlling the position of the stitcher wheels with respect to the tire building drum.

SUMMARY OF THE INVENTION

A tire building apparatus comprising a frame including an inboard end and an outboard end, said inboard end including a lower section mounted on said frame and an upper section on it for pivotal movement on said lower section, support means extending outwardly from and rotatably mounted for pivotal movement with said upper section, a rotatable tire building drum mounted on said support means, and drive means operably coacting between said frame and said upper section for selectively pivoting said support means about a generally vertical axis so as to swing said drum outwardly of said frame in a generally horizontal plane upon actuation of said drive means. The outbroad end includes a centering means extending outwardly for generally axial movement toward and away from said support means, and has power means for selectively engaging and disengaging said centering means with the free end of said support means to permit said drum to be swung outwardly of said frame for removal of a green tire carcass formed on said drum. A power means is supported by said upper section and extends into said lower section for pivotal movement with said upper section, and drive means operably connecting said power means to said support means for rotating the same about a generally horizontal axis upon actuation of said power means. The drive means for the upper section includes a power means mounted on said lower section, and linkage means operably connected between said power means and said upper section for selectively pivoting said upper section about a vertical axis upon actuation of said power means. The apparatus includes a bead setter means mounted on said inboard and outboard ends for generally axial movement toward and away from said drum, and each of the bead setter means includes a generally cylindrical bead holder having a generally centrally disposed male sleeve member disposed therein, and said drum including a female sleeve member disposed adjacent the opposed ends thereof adapted to receive said male sleeve members in telescopic sliding relation upon movement of said bead holders toward said drum. The apparatus of the invention further includes a stitcher mechanism mounted on the frame between said inboard and outboard ends, the mechanism including a pair of stitcher units mounted for generally axial movement toward and away from one another adjacent said drum, and each of the units including a first power means for moving a first stitcher wheel toward and away from said drum, and a second power means for moving a second stitcher wheel toward and away from the drum. In the invention, a bracket means connects said first power means to said second power means to enable said stitcher wheel to move, as a unit, relative to said drum upon actuation of said first power means independent of actuation of said second power means. A selectively adjustable means coacts with the first power means for selectively controlling movement of said first stitcher wheel relative to the drum independent of actuation of said second power means.

From the foregoing and following description together with the accompanying drawings, it will be seen that the present invention provides an improved construction for the tire buildings apparatus of the drum type for building a tire carcass for automotive vehicles. In the invention, the apparatus includes a novel construction for the bead setter units which may be moved axially toward and away from one another for setting the bead rings and which provide a generally rigid support for the tire building drum during the build-up of the tire carcass thereby to provide a high degree of stability during the tire building operation so as to achieve a finished product of high quality by minimizing radial run-out in the finished product. Furthermore, the invention provides a novel arrangement for automatically swinging the tire building drum outwardly of the machine upon simple disengagement from its supported relation with the outboard end of the machine to provide quick and easy removal of the "green" tire carcass from the drum. Accordingly, this construction provides high strength and structural support during the tire building operation while enabling ready removal of the finished product with a minimum of time and effort. The invention further provides a novel and improved construction for a stitcher mechanism which can be readily employed with a drum type tire building apparatus which provides selective control of the smooth and star stitcher wheels, for example, during the tire building operation. The stitcher mechanism includes a variable, stroke limiting, stop construction which enables simultaneous and/or independent movement of the respective stitcher wheels radially toward and away from the drum. By this arrangement, both the smooth stitcher wheel and the start stitcher wheel are enabled to ride against the ply build-up on the drum, but the movement of the smooth stitcher wheel is controlled so that it will not ride against that portion of the ply build-up lying on the turnup bladders.

DESCRIPTION OF THE PREFERRED EMBODIMENTS

Figure 1:
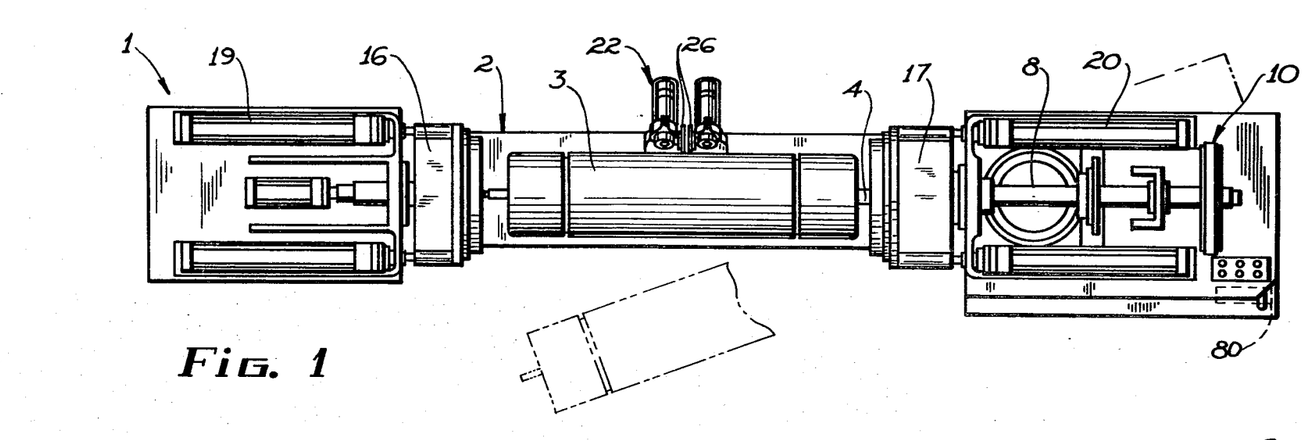
FIG. 1 is a top elevation view of the tire building machine of the present invention.
Figure 2:
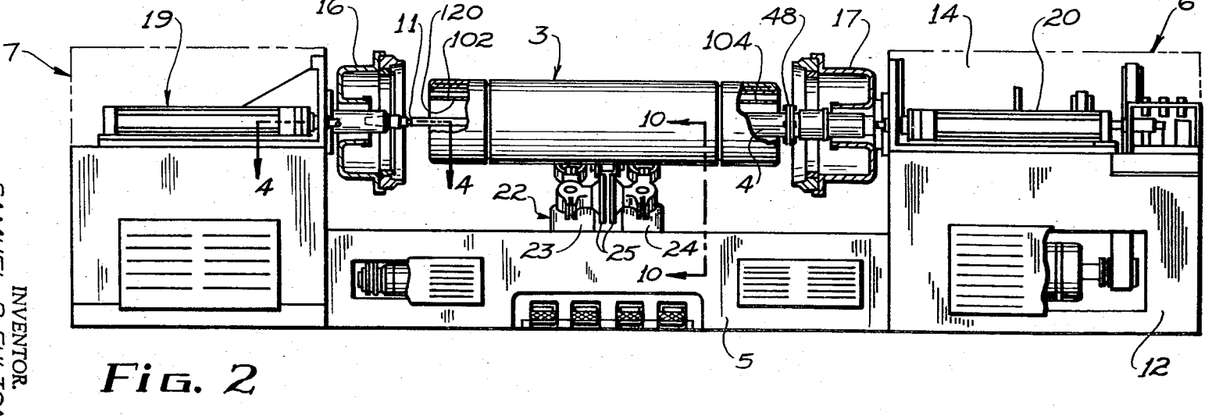
FIG. 2 is a side elevation view, partly in section of the tire building machine illustrated in FIG. 1.

Referring now again to FIGS. 1 and 2, there is illustrated generally at 1, a tire building machine having a frame 2 on which a drum 3 is mounted for rotation with a rotatable shaft 4. The frame 2 includes a center bed section 5, an inboard end 6 and an outboard end 7. The shaft 4 is fixably coupled at one end, such as the inboard end 6, to a drive shaft 8. The drive shaft 8 is operably connected to a suitable drive mechanism, indicated generally at 10, which is carried by the frame 2 adjacent the inboard end thereof. The opposite end of the shaft is detachably connected, such as at 11, to the opposite or outboard end 7 of the frame. As shown in FIG. 2, the inboard end 6 includes a stationary lower section 12 and a turret-like upper section 14 which is movably mounted on the lower section 12 for rotation in a horizontal plane about a generally vertical axis. By this arrangement, the drum 3 may be disconnected from the outboard end 7 of the frame, and then swung in a radial path outwardly away from the frame, as indicated by the phantom lines in FIG. 1, to enable a finished tire carcass formed thereon to be easily and readily accessible for removal therefrom.

Bead setter units 16 and 17 are mounted adjacent the opposite ends of the drum 3 being operably connected to a fluid operated mechanism, such as at 19 and 20, for moving the units 16 and 17 toward and away from the drum for placement of bead rings therewith in a manner to be more fully described hereinafter.

A stitcher mechanism 22 is mounted on the center bed section 5. The stitcher mechanism includes a pair of stitcher units 23 and 24 which are adapted for movement axially with respect to the tire building drum. Each of the stitcher units includes a smooth stitcher wheel, as at 25, and a star stitcher wheel, as at 26, which is adapted for selectively controlled movement radially with respect to the tire building drum 3 for stitching the fabric plies applied thereto in a manner to be more fully described hereinafter.

Figure 3:
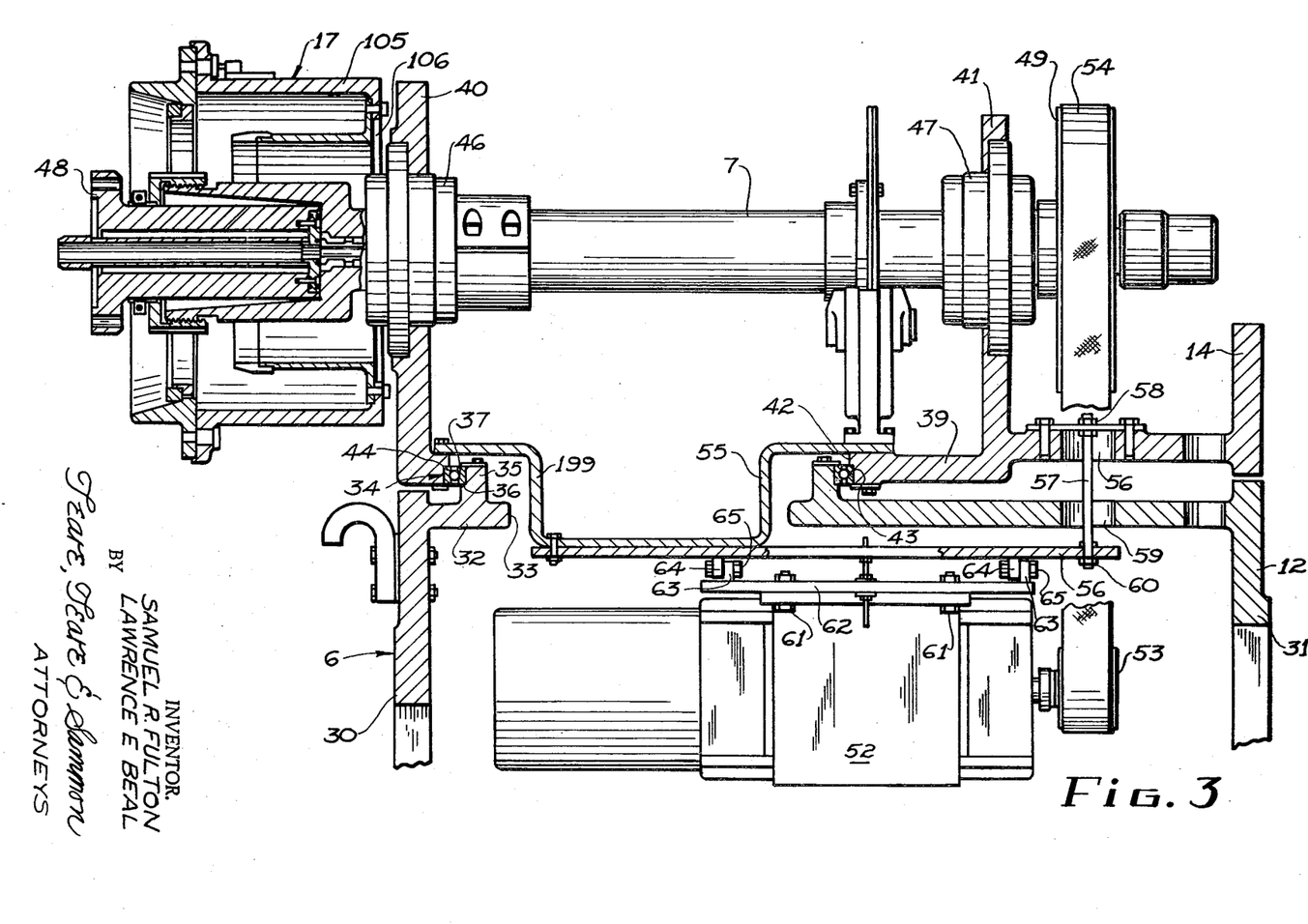
FIG. 3 is a fragmentary, partially in section, side elevation view of the inboard end of the tire building machine illustrated in FIG. 2.

Referring now to FIG. 3, to achieve swinging movement of the upper section 14 with respect to the lower section of the inboard end 6, the lower section 12 is provided with upright walls 30 and 31 which support a top plate 32. The plate 32 is provided with an opening 33 therein which is surrounded by a generally upright cylindrical flange 35. A large ring bearing 34 is carried by the flange 35 adjacent the upper end thereof being adapted to support the upper section 14 for movement relative to the lower section 12. As shown, the flange 35 is provided with a recess having a shoulder 36 adapted for seating engagement with the inner race 37 of the bearing 34. Further, the upper section 14 is provided with a base plate on which are mounted generally upright extending support plates 40 and 41. The base plate 39 is provided with an opening 42 which is defined by a cylindrical wall 42 which is mounted generally concentrically with respect to the flange 35 and adapted for seated engagement with the outer race 44 of the bearing 34. By this arrangement, the upper section 14 is free to rotate in a horizontal plane about an axis which extends generally vertically through the geometrical center of the bearing 34.

As shown, the upright plates 40 and 41 extend generally parallel with respect to one another and support bearings 46 and 47 in which the shaft 7 is journalled for rotation. The inboard end of the shaft 7 includes a flange 48 which is rigidly coupled to the shaft 4 (FIG. 2) for supporting the drum 3 in cantilevered-like relation when the opposite end of shaft 4 is disengaged from the outboard end 7. The drive mechanism 10 is mounted adajcent the opposite end of the shaft 7 and includes a pulley member 49 which is mounted on the shaft 7 in a manner well known in the art. Electric motor 52 is connected to the upper section in underslug relation having a pulley member 53 operably connected thereto. A belt 54 is entrained about the pulleys 49 and 53 so that upon operation of the motor 52 movement will be imparted to the drum 3.

To support the motor 52 in the manner previously described, a support plate 55 is mounted on the base plate 39 and is structurally configured so as to extend downwardly through the opening 33 being adapted to support one end of a support plate 56 which is disposed within the lower section 12. The opposite end of the plate 56 is connected to the base plate 39 by a suitable support member, such as a rod 57. The rod 57 may be connected to the base plate 39 in any suitable manner, such as by fastener 58, and preferably extends generally downwardly through an opening 59 in the top plate 32 being connected to the plate 56, such as by fasteners 60. Preferably, the opening 59 is generally arcuate, when viewed in top plan, to enable the rod 57 to move with respect to the top plate 32. The motor 52 is preferably connected to an adaptor plate 62, such as by bolts 61, which is provided with a pair of upwardly extending lugs 63. The support plate 56 may be provided with a pair of downwardly depending lugs 64 which are adapted for connection with the lugs 63, such as by bolts 65, for supporting the motor 52 in the aforementioned underslug relation within the lower section 12. By this arrangement, the motor 52 will move within the lower section 12, as a unit, with the upper section 14 so that the drive mechanism will not have to be disconnected upon swinging movement of the upper section 14 with respect to the lower section 12.

Figure 4:
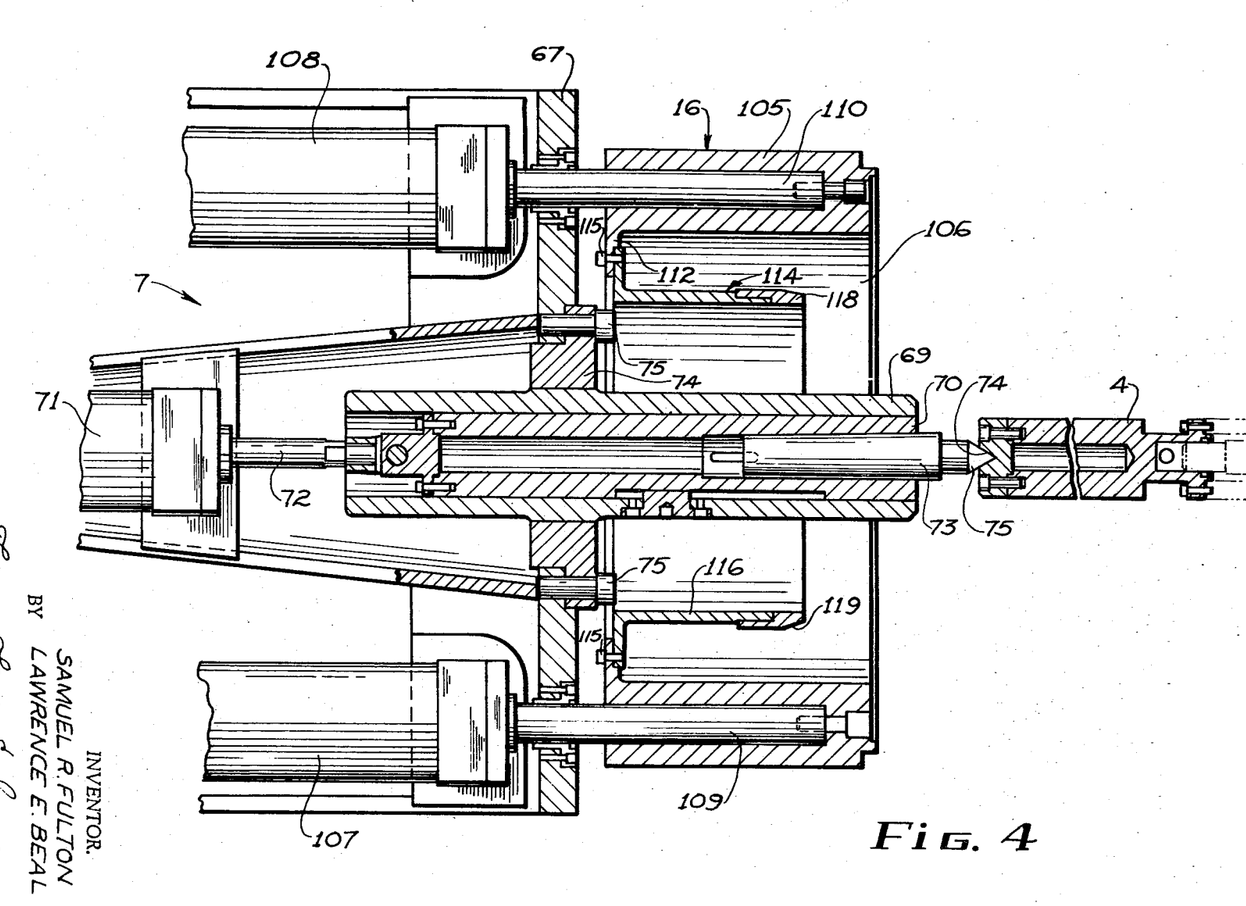
FIG. 4 is a fragmentary, partially in section, top plan view of the outboard end of the tire building machine illustrated in FIG. 1.

Referring now to FIG. 4, the outboard end 7 of the frame 2 includes a generally upright support plate 67. A sleeve 69 is mounted on the plate 67, and supports a plunger member 70 adapted for reciprocating movement therein. A fluid actuated motor 71 is connected, such as by the connecting rod 72 to one end, such as the outboard end, of the plunger member 70, to impart reciprocating movement thereo. The sleeve 69 is mounted on a support bracket, such as by welding or the like, having its central longitudinal axis on it in axial alignment with drive shaft 7. The support bracket 74 may be connected to the plate 67 in any suitable manner, such as by bolts 75 or the like. By this arrangement, upon actuation of the fluid motor 71 the spindle may be moved into and out of engagement with the shaft 4. As shown, the shaft 4 includes a generally conically-shaped bore which opens outwardly in a direction toward the spindle 73. The spindle 73 is provided with a pointed center 75 which is received within the bore 74 to support the outer end of the shaft 4 during the tire building operation.

Figure 6:
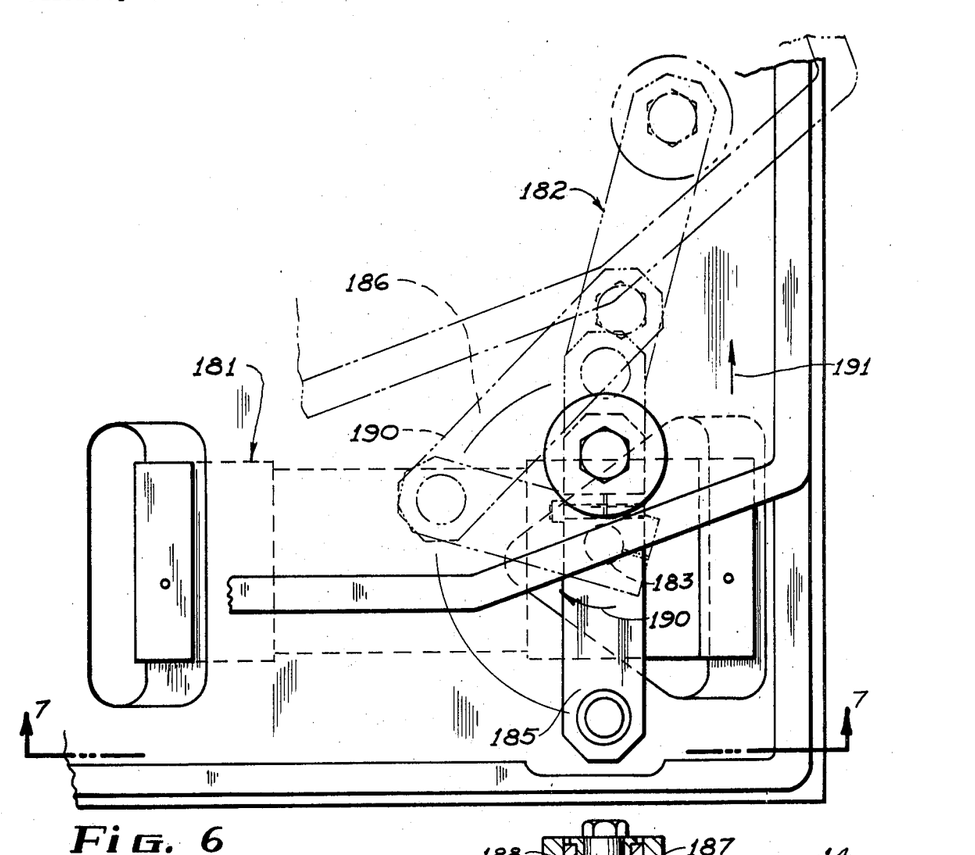
FIG. 6 is an enlarged, top plan view of the shifting mechanism of the present invention showing intermediate positions of the linkage assembly in dotted lines.
Figure 7:
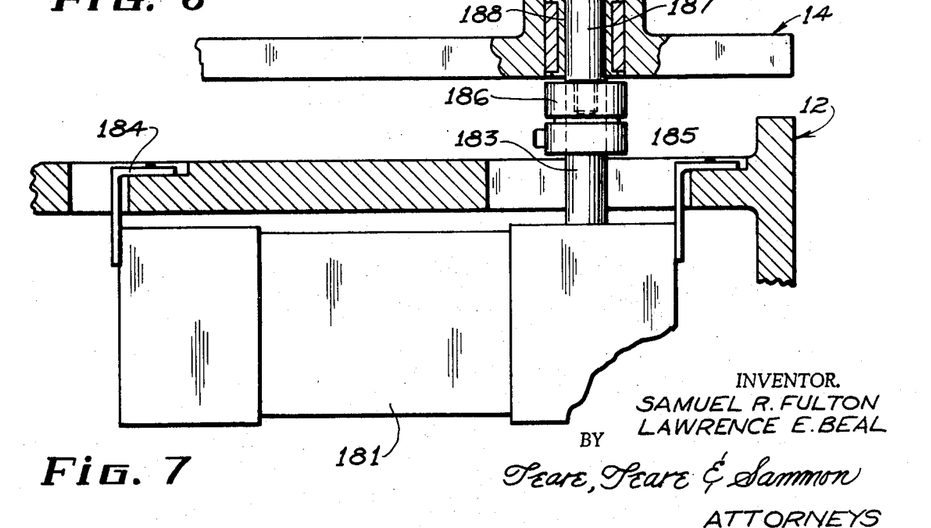
FIG. 7 is a fragmentary, partially in section view, taken along the line 7—7 in FIG. 6.

Referring again to FIG. 1, a shifting mechanism 80 is operably connected between the upper section 14 and the lower section 12 to swing the drum 3 outwardly away from the center bed section 5 as previously described. Referring now to FIGS. 6 and 7, the swinging mechanism 80 includes a drive unit 181 which is operably connected to a linkage assembly 182. The drive unit 181 includes an upstanding drive shaft 183 which is adapted for rotation about a generally vertical axis. The drive unit may be any suitable device capable of imparting such rotational action to the drive shaft 183 and in one form may comprise a fluid actuated cylinder of the dual-piston type which is adapted to convert linear motion into rotational motion as well known in the art. The drive unit 181 is rigidly mounted on the lower section 12, such as by brackets 184, being adapted for connection to the upper section 14 by means of the linkage assembly 182. The drive shaft 183 is coupled to one end of a drive link 185 which is adapted for rotation in a generally horizontal plane about the central axis of the shaft 183. The opposite end of the link 185 is pivotally connected to one end of an intermediate or shifting link 186 which extends laterally in overlying relation with respect to the drive link 185 in the non-actuated position. The opposite end of the intermediate link 186 is pivotally connected to the upper section 14. The link 186 may be connected to the upper section in any suitable manner, such as by a bolt 187. The bolt may be supported within a sleeve 188 to permit free pivotal movement of the bolt 187 with respect to the upper section and to reduce wearing on the bolt 187. By this arrangement, when it is desired to shift the upper section 14 with respect to the lower section 12, the drive unit 181 is actuated causing the shaft 183 to rotate in a clockwise direction, as indicated by the arrow 190 (FIG. 6) causing the link 186 to be moved outwardly from alignment with the link 185 resulting in the upper section being forced to move in the direction of movement of the link 186, as indicated by the arrow at 191. Preferably, the fluid actuated motor 181 is selected so that upon completion of the stroke therein, the links 185 and 186 will be aligned in lengthwise relation to one another, and thus, terminate the shifting movement of the upper section 14. When it is desired to return the upper section 14 to its original position, the fluid actuated motor is reversed, and the drive shaft 183 is rotated in counter-clockwise direction opposite to that indicated by the arrow 190, and thus, the links are returned to their original overlying relation.

Figure 5:
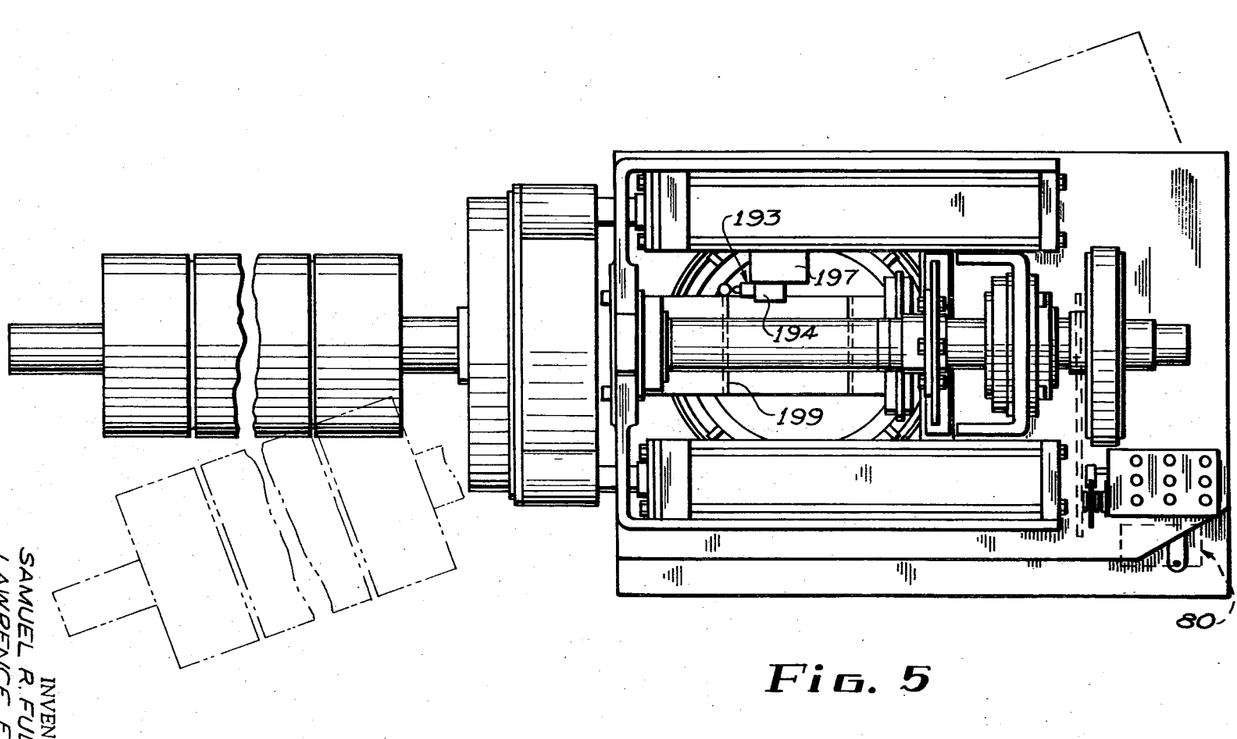
FIG. 5 is an enlarged, top plan view of the inboard end of the tire building machine illustrated in FIG. 1.
Figure 8:
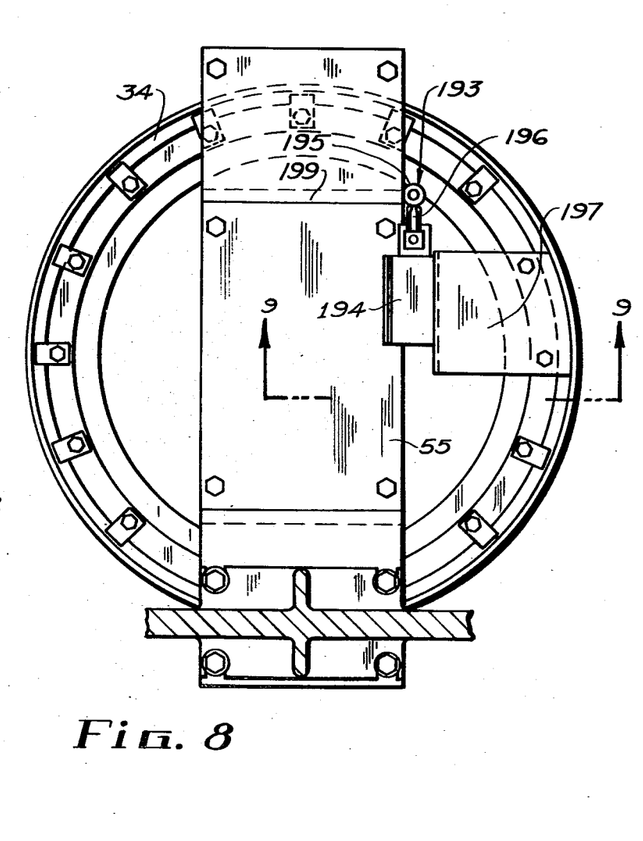
FIG. 8 is an enlarged, fragmentary, top plan view of a portion of the inboard end of the tire building machine illustrated in FIG. 1.
Figure 9:
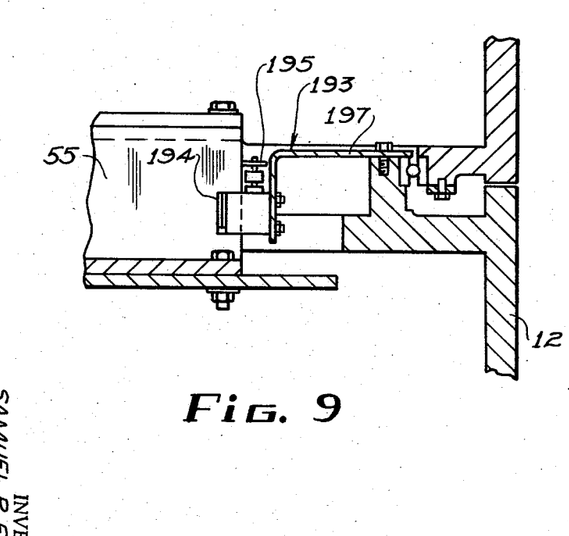
FIG. 9 is a cross sectional view taken along the line 9—9 of FIG. 8.

Referring now to FIGS. 5, 8 and 9, a safety device 193 is provided to prevent operation of tire building machine while the upper section is in the rotated position. In the form shown, the safety device 193 comprises a limit switch 194 having a roller 195 supported at the end of a switch arm 196. The limit switch 194 is mounted on a bracket 197 which is supported on the lower section 12 so as to be maintained in a stationary position. Preferably, the plate 55 is generally U-shaped in configuration, when viewed in side elevation (FIG. 3) having a vertically extending leg 199 disposed in engagement with the roller 195 when the upper section 14 is in its normal position. When the upper section 14 is rotated with respect to the lower section 12, the leg 199 will move out of engagement with the roller 195. The limit switch 193 may be connected in the tire building machine control to de-energize the control switches so that upon disengagement of the leg 199 it will not be possible to operate the tire building machine.

Now in accordance with another feature of the invention, the bead setter units 16 and 17 are supported on the outboard and inboard end 6, respectively, for movement relative to the drum 3 being adapted for telescopic connection with the opposed ends thereof to rigidly support the drum during the bead placement operation. More specifically, the outer ends of the drum are provided with generally cylindrical, sleeve-like receptacles 102 and 104 which are adapted to receive in telescopic relation sleeve-like projections carried by the bead setter unit 16 and 17, respectively.

As the bead setter units 16 and 17 are essentially identical in configuration, only one, such as 16, will be described in detail with like parts on the bead setter unit 17 being designated by like numerals.

The bead setter unit 16 includes a hollow housing 105 having a generally cylindrical opening 106 therein which opens outwardly in a direction toward the adjacent end of the drum 3. The opposite sides of the housing 105 are connected to fluid actuated motors 107 and 108 by means of piston rods 109 and 110 which support the housing 105 to position the opening 106 in generally axial alignment with respect to the central longitudinal axis of the shaft 4. By this arrangement, the housing 105 may be moved toward the drum 3 to position the drum within the opening 106. As shown, the housing is provided with a radially depending flange 112 at the end remote from the open end. A sleeve-like projection 114 is mounted within the opening 106 being secured to the flange 112, such as by bolts 115 or the like. The projection 114 is defined by a cylindrical body 116 which extends axially in spaced relation with respect to the housing and in a direction toward the open end thereof. The body 116 is disposed generally concentrically and in spaced relation with respect to the sleeve 69 so that it may move freely into engagement with the drum 3.

The receptacles 102 and 104 carried adjacent the opposite end of the drum 3 may be secured to the drum in any suitable manner, such as by bolts or the like (not shown). As shown in FIG. 2, the receptacles include a generally cylindrical body having an opening therein having a diameter slightly larger than the diameter of the projections 114 being adapted to receive the latter in telescoping relation therein. As shown in FIG. 4, the leading end of the body 116 may be provided with cylindrical collars 118 having tapered edges, such as 119 for guiding the projections into the openings in the receptacles 102 and 104. Further, the leading end of the receptacles 102 and 104 may be conversely tapered, as at 120, to facilitate sliding action of the projections with respect to the receptacles upon contact with one another. By this arrangement, both ends of the tire drum can be rigidly supported during the bead placement operation to permit the maintenance of closer tolerances, and thus, reduce substantially the radial runout in the finished tire product.

STITCHER MECHANISM

Figure 10:
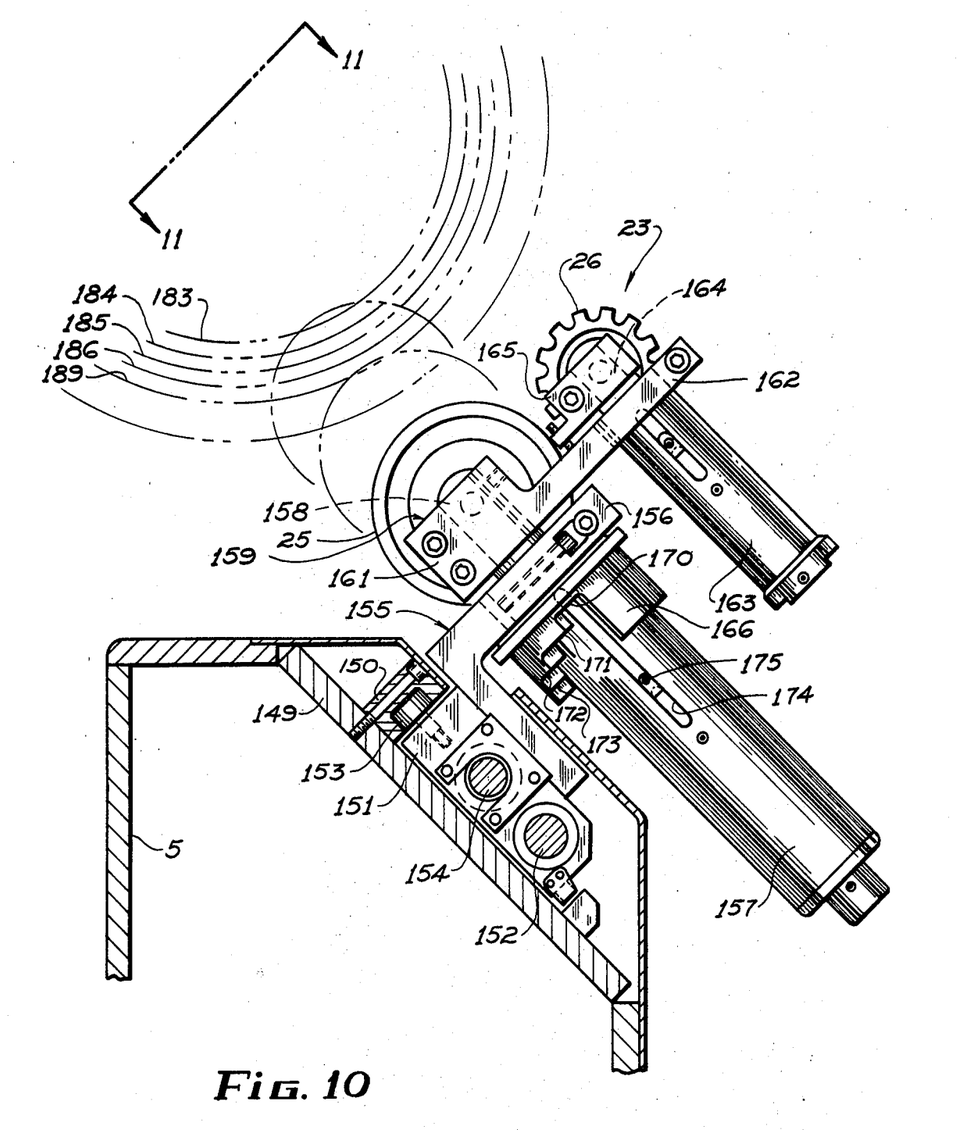
FIG. 10 is a side elevation view of the stitcher mechanism of the present invention taken along the line 10—10 of FIG. 1.
Figure 11:
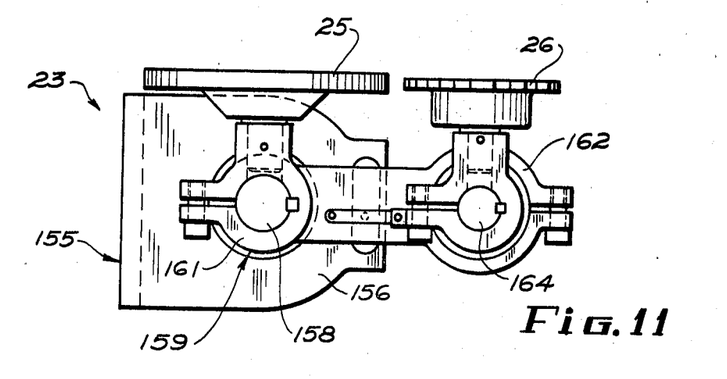
FIG. 11 is a view taken along the line 11—11 of FIG. 10.

Referring now to FIG. 10, the stitcher units 23 and 24 of the stitcher mechanism 22 are essentially identical in configuration, and thus, only one, such as 23, will be described in detail with like components of the stitcher unit 24 being designated by like numerals, when necessary. As shown, the stitcher unit 23 is supported for relative movement back and forth along the center bed section 5. The center bed section is shown as having a support plate 149 on which is mounted a cam track 150 adapted for guiding the stitcher unit 23 in its movement along the center bed section 5. The stitcher unit 23 comprises a carriage member 151 which is mounted for sliding movement on a guide bar or rod 152. A cam member is secured to the carriage member and disposed for sliding movement on the cam track 150 to provide a rigid support against rotation of the carriage member during the stitching operation. A suitable drive member, such as a screw member 154, is operably connected to the carriage member to impart movement thereto. A suitable drive mechanism (not shown) may be connected to the screw member 154 to impart rotational movement in a manner well known in the art. A support bracket 155 is suitably attached, such as by welding or the like, to the carriage member 151 being adapted to support the smooth stitcher wheel 25 and star stitcher wheel 26. As shown, the bracket 155 is generally L-shaped in configuration when viewed in side elevation having a clamp-like leg 156 which projects generally upwardly and outwardly from the carriage being adapted for clamping engagement about a fluid actuated motor 157. The fluid actuated motor is positioned so as to have its longitudinal central axis extending generally radially with respect to the tire building drum so that upon actuation thereof the smooth stitcher wheel 25 will be moved into contact with the plies on the drum to perform the stitching operation. As shown, the fluid actuated motor 157 includes a piston rod 158 which projects upwardly and forwardly beyond the leg 156 being adapted to support a holding member 159. The holding member comprises a clamp-like base 161 which is adapted for clamping engagement with the piston rod 158 and an outwardly projecting arm 162 which is adapted for clamping engagement with another fluid motor 163. The smooth stitcher wheel 25 is journalled for rotation in the base portion 161 being adapted for rotational movement in a generally vertical plane. By this arrangement, actuation of the fluid actuated motor 157 will cause the piston 158 to telescopingly move toward the tire drum 3, and thus, move the smooth stitcher wheel 25 into engagement with the fabric plies carried thereon.

Figure 12:
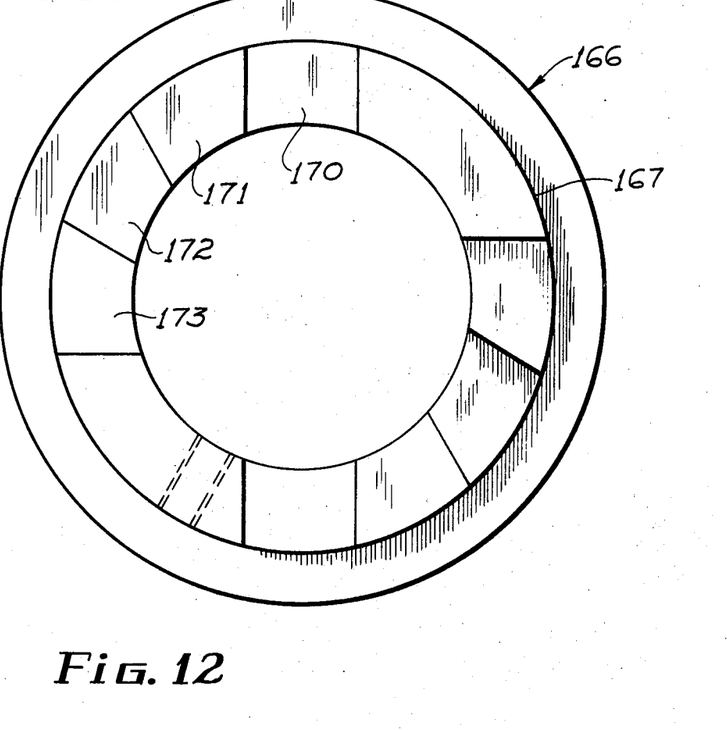
FIG. 12 is a bottom end view of the adjustable collar of the present invention.
Figure 13:
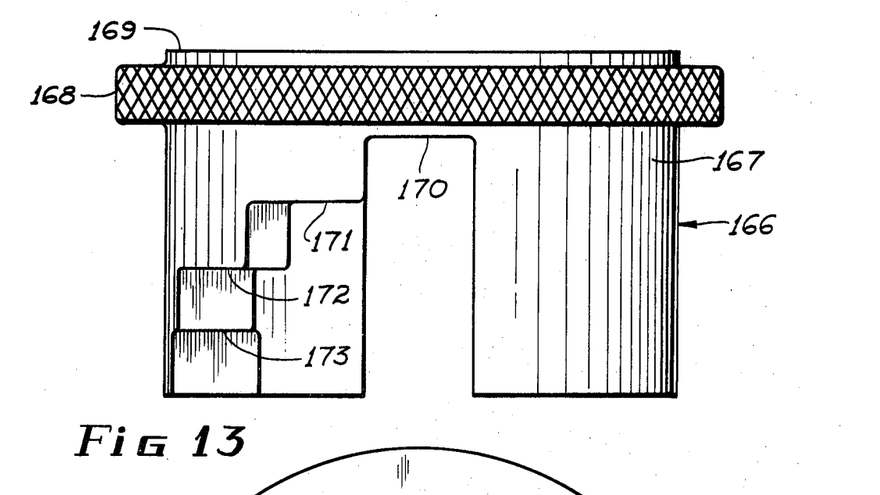
FIG. 13 is a side elevation view of the adjustable collar illustrated in FIG. 12 when looking from the top of FIG. 12.

The fluid actuated motor 163 includes a piston rod 164 which projects upwardly and outwardly beyond the arm 162. As shown, the rod 164 has its central longitudinal axis aligned generally parallel with respect to the central longitudinal axis of the rod 158 so that the direction of movement of the piston rods 164 and 158 will be generally parallel. A collar member 165 is suitably connected to the piston rod 164. The star stitcher wheel 26 is journalled for rotation in the collar 165 being adapted for rotation in a generally vertical plane. Preferably, the fluid actuated motors 157 and 163 are connected to a common source of pressurized fluid, but are controlled in such a manner so as to be separately actuatable. This may be accomplished in numerous ways well known in the art, such as by the use of control valves or the like. As shown, the leg 156 provides a rigid support for the fluid actuated motor 157 so that the motor 157 will not shift with respect to the leg 156 when the smooth stitcher wheel 25 engages the tire drum 3 during the stitching operation. A cylindrical collar is mounted on the fluid actuated cylinder 157 being adapted to control the stroke of the piston rod 158 upon actuation thereof. As shown in FIGS. 12 and 13, the collar 166 includes a generally cylindrical body 167 having a knurled flange adjacent one end thereof to facilitate gripping engagement therewith. As shown, one end, such as the end adjacent the flange 169 is machined so as to provide an abutment for engagement with the leg 156 and provide a rigid support to prevent upward movement of the collar with respect to the fluid actuated motor 157. The body of the collar 166 is provided with a plurality of stepped recesses 170–173. The recesses decrease in depth from the deepest recess 170 to the shallowest recess 173.

Referring momentarily to FIG. 10, the fluid actuated motor 157 is provided with a milled slot. A projection 175 is carried by the piston rod 158 and extends through the slot 174 beyond the outer surface of the fluid actuated motor being adapted for abutting engagement with the collar to limit the length of throw of the piston rod 158.

Figure 14:
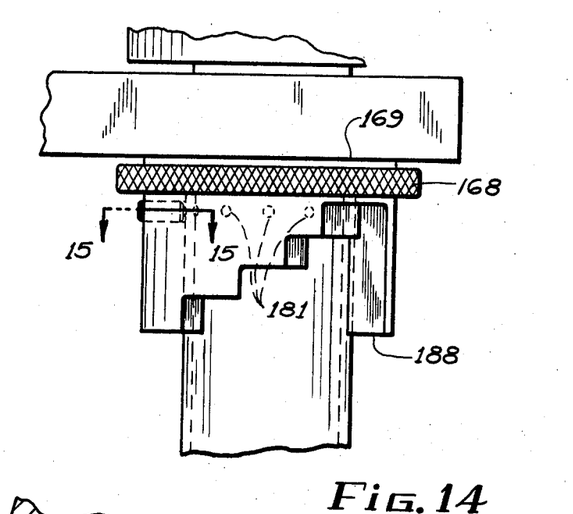
FIG. 14 is a side elevation view of the adjustable collar illustrated in FIG. 12 shown in the mounted position.
Figure 15:
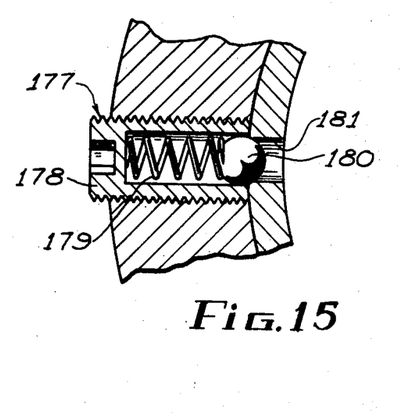
FIG. 15 is a view taken along the line 15 of FIG. 14.

Referring now to FIG. 15, the body 167 of the collar is provided with a detent member. In the form shown, the detent member 177 comprises a plug 178 which is threadably secured to the collar and supports a spring 179 which biases a ball 180 into engagement with the confronting wall of the fluid actuated motor 157. The fluid actuated motor may be provided with flat spots, such as a hole 181 adapted to receive the ball 180 in seated engagement therein for locking the collar in a preselected position with respect to the fluid actuated motor 157. Referring now to FIG. 14, the fluid actuated motor may be provided with a plurality of such holes 181 spaced circumferentially thereabout. By this arrangement, the collar 166 may be rotated with respect to the inner cylinder to position a selected one of the recesses in alignment with the milled slot 174. By this arrangement, the floors of the respective recesses will provide abutments for engagement with the projection 175, and thus, control the length of the stroke of the piston rod 158.

As the fluid actuated motor 163 is rigidly secured to the arm 162 of the bracket 159, the star stitcher wheel will move, as a unit, with the smooth stitcher wheel upon actuation of the fluid actuated motor 157. As we have indicated, the fluid actuated motor 163 may operate independently of the fluid actuated motor 157. The star stitcher wheel can be made to move into contact with the fabric plies on a tire drum when the fluid actuated motor 157 is in the non-actuated condition. This arrangement has significance when stitching adjacent the turnup bladders when it is desirable to maintain the roll stitcher wheel 25 out of contact with the fabric plies.

As shown in FIG. 10, when the recess 170 is aligned with the mill slot 174, the smooth stitcher wheel and star stitcher wheel 25 and 26, respectively, will move to a point indicated by the doted line 183. Likewise, upon rotation of the collar 166 the travel of the smooth stitcher wheel 25 and star stitcher wheel 26 will terminate at a distance indicated by the dotted lines 184, 185 and 186 upon alignment of the recesses 171, 172, and 173, respectively, with the slot 174. Preferably, the edge 188 of the collar 166 opposite the edge 169 may also be machined so as to provide an additional abutment for engagement with the projection 175 which would limit the travel of the wheel 25 and 26 at a point indicated by the line 189.

We claim:
1. A tire building apparatus comprising,
  a frame,
  said frame including an inboard end and an outboard end, said inboard including a lower section and an upper section mounted for pivotal movement on said lower section about a generally vertical axis between a tire building position and a tire unloading position, support means mounted on said upper section for pivotal movement, as a unit, with said upper section, a shaft member having one end journalled for rotation in said support means for rotation about a generally horizontal axis and its opposite end rotatably supported adjacent said outboard end, said outboard end including centering means for detachably supporting said opposite end of said shaft to enable said shaft to pivot, as a unit, with said support means upon pivotal movement of said support means between said tire building position and said tire unloading position, a rotatable tire building drum mounted on said shaft for rotation therewith, said centering means including a plunger member extending outwardly from said outboard end in axially aligned relation to the axis of rotation of said shaft member when said support means is in the tire building position, said plunger member being mounted for reciprocating movement in the axial direction of said shaft member, means on said plunger member for engaging and rotatably supporting said opposite end of said shaft member, selectively actuatable power means operably connected to said reciprocating member for selectively moving said plunger member in one axial direction for engagement with said opposite end of said shaft member and in the opposite axial direction for disengagement from said shaft member, and selectively actuatable drive means operably coacting between said frame and said upper section for selectively pivoting said support means about said generally vertical axis from said tire building position to said tire unloading position upon disengagement of said plunger member from said opposite end of said shaft member.

2. A tire building apparatus in accordance with claim 1, including another power means for rotating said shaft member about a generally horizontal axis, said other power means being supported by said upper section and extending into said lower section for pivotal movement with said upper section, and drive means operably connecting said other power means to said support means for rotating said shaft member about said horizontal axis upon actuation of said power means.

3. A tire building apparatus in accordance with claim 1, wherein said reciprocating member comprises a spindle having a pointed end, and said opposite end of said shaft includes a bore which opens outwardly in the direction of said spindle being adapted to receive said pointed end therein for supporting said shaft member in the tire building position.

4. A tire building apparatus in accordance with claim 3, wherein said bore is generally conically-shaped in configuration.

5. A tire building apparatus in accordance with claim 1, wherein said drive means includes a power means mounted on said lower section, and linkage means operably connected between said power means and said upper section for selectively pivoting said upper section about a vertical axis upon actuation of said power means.

6. A tire building apparatus in accordance with claim 5, wherein said linkage assembly includes a drive shaft connected to said power means for rotation about a generally vertical axis, a pair of link members mounted in overlying relation with respect to one another, said link members having their lengthwise axis aligned with another being pivotally connected to one another at one end, one of said link members being connected to said drive shaft for rotation in a generally horizontal plane and the other of said link members being connected to said upper section to cause said upper section to move relative to said lower section upon rotation of said drive shaft to move said link members from their aligned overlying relation to an aligned extended relation.

7. A tire building apparatus in accordance with claim 1, including bearing means disposed between said upper and lower sections, said bearing means including an inner race means carried by said lower section, and an outer race means carried by said upper section.

8. A tire building apparatus in accordance with claim 1, including a bead setter means mounted on said inboard and outboard ends for generally axial movement toward and away from said drum.

9. A tire building apparatus in accordance with claim 8, wherein each of said male sleeve members including a leading edge tapered in one direction, and each of said female sleeve members including a leading edge tapered conversely to the leading edge of said male sleeve members to facilitate sliding action of said male sleeve members into said female sleeve members.

10. A tire building apparatus in accordance with claim 8, wherein said bead setter means each include a generally cylindrical bead holder having a generally centrally disposed male sleeve member disposed therein, and said drum including a female sleeve member disposed adjacent each of the opposed ends thereof adapted to receive said male sleeve members in telescopic sliding relation upon movement of said bead holders toward said drum.

11. A tire building apparatus in accordance with claim 10, wherein said male sleeve member is mounted in generally concentric spaced relation from said plunger member to enable said male sleeve member to move relative to said plunger member and into engagement with said female sleeve member on said drum.

12. A tire building apparatus in accordance with claim 1, including switch means operably connected between said upper section and said lower section to prevent operation of said tire building machine when said upper section is in the tire unloading position.

13. A tire building apparatus in accordance with claim 12, wherein said switch means comprises a limit switch including a switch arm mounted on said lower section, and an actuating member is mounted on said upper section in engaged relation with said contact arm when said drum is supported in the tire building position being adapted to be moved out of engagement with said switch arm when said drum is moved to the unloading position.

References Cited

UNITED STATES PATENTS

| | | | |
|---|---|---|---|
| 1,603,855 | 10/1926 | Midgley | 156—396 |
| 3,479,238 | 11/1969 | Kehoe et al. | 156—401 |
| 2,818,907 | 1/1958 | Sapp | 156—396 |
| 2,951,526 | 9/1960 | Haase | 156—401 |

STEPHEN C. BENTLEY, Primary Examiner